United States Patent

Sahashi

[11] Patent Number: 5,852,964
[45] Date of Patent: Dec. 29, 1998

[54] SAFETY MECHANISM FOR RIGHT ANGLE SHEAR

[75] Inventor: Nobuo Sahashi, Inuyama, Japan

[73] Assignee: Murata Kikai Kabushiki Kaisha, Kyoto, Japan

[21] Appl. No.: 941,247

[22] Filed: Sep. 30, 1997

[30] Foreign Application Priority Data

Oct. 2, 1996 [JP] Japan .................................. 8-281890

[51] Int. Cl.$^6$ ..................................................... B26D 5/16
[52] U.S. Cl. ............................... 83/530; 83/564; 83/589; 83/699.61
[58] Field of Search ............................. 83/628, 523, 563, 83/639.1, 582, 588, 694, 698.31, 699.31, 699.41, 699.51, 699.61, 527, 528, 529, 530, 564, 589

[56] References Cited

U.S. PATENT DOCUMENTS

| | | | |
|---|---|---|---|
| 3,742,801 | 7/1973 | Cailloux | 83/391 |
| 4,394,829 | 7/1983 | Stoehr | 83/314 |
| 4,463,642 | 8/1984 | Minato et al. | 83/530 |
| 4,679,473 | 7/1987 | Hirata et al. | 83/157 |
| 4,757,705 | 7/1988 | Arima et al. | 72/456 |
| 4,823,665 | 4/1989 | Cavagna | 83/529 |
| 5,016,505 | 5/1991 | Chapman | 83/198 |
| 5,195,414 | 3/1993 | Ogasawara | 83/155 |
| 5,237,901 | 8/1993 | Warga | 83/583 |
| 5,460,067 | 10/1995 | Reis et al. | 83/19 |
| 5,518,515 | 5/1996 | Blaskowitz et al. | 65/334 |

*Primary Examiner*—Eugenia A. Jones
*Assistant Examiner*—T. Anthony Vaughn
*Attorney, Agent, or Firm*—Armstrong, Westerman, Hattori, McLeland & Naughton

[57] ABSTRACT

When power failures or breakdowns occur, an apparatus that is able to hold the upper blade in the raised position without using the drive source and increase the safety and facilitate maintenance and inspection.

The work cutting apparatus that cuts by a pair of upper and lower blades is provided with a freely rotating ram mounted with an upper blade, a ram drive device that rotates the ram and an exertion devices that applies a force in the upwards rotation direction to the ram. The rotation center shaft of the ram is positioned at a angle within the horizontal plane with respect to the sides of the pair of upper and lower blades. The exertion devices is positioned such that the horizontal component of that applied force is at right angles to the rotation center shaft. Furthermore, the exertion devices comprises a plurality of coil springs and positions these plural coil springs parallel such that the ends are each aligned with each other along one side of the upper and lower blades.

3 Claims, 10 Drawing Sheets

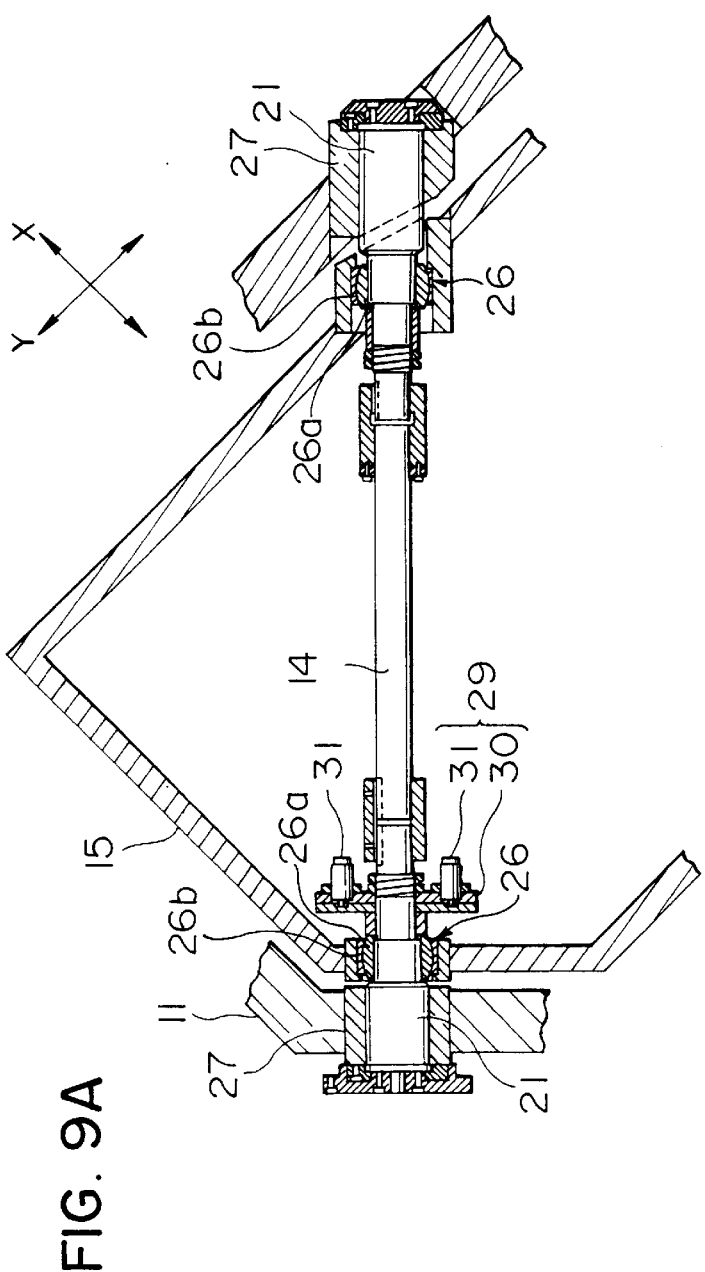
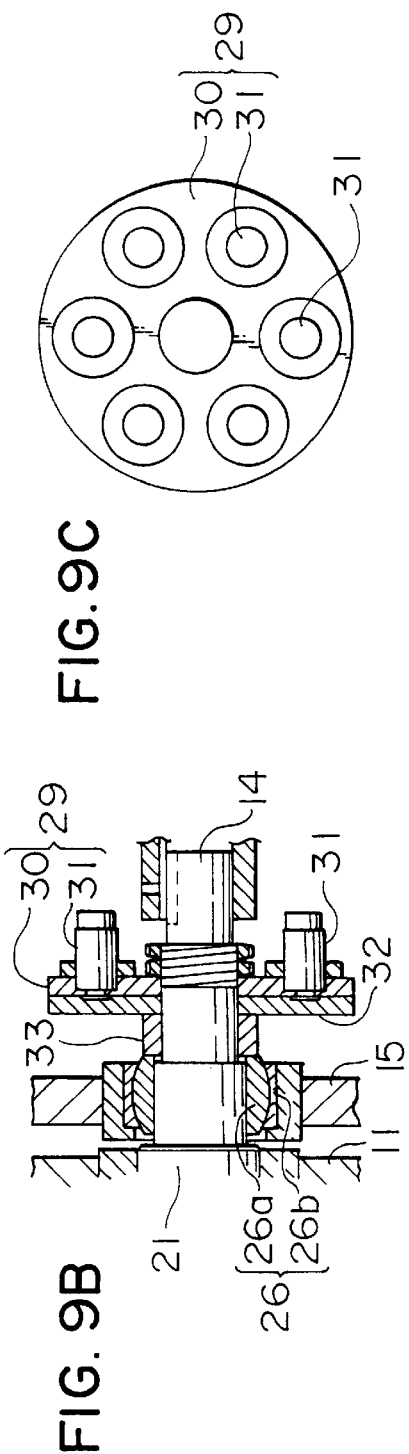
FIG. 9A
FIG. 9B
FIG. 9C

SAFETY MECHANISM FOR RIGHT ANGLE SHEAR

FIELD OF THE INVENTION

The present invention relates to a work cutting apparatus such as a right angle shear or the like that cuts work such as plate metal or the like by a pair of upper and lower blades.

BACKGROUND OF THE INVENTION

Conventionally, on a work cutting apparatus such as a right angle shear or the like, the ram mounted with the upper blade is supported so as to be able to freely move vertically about a horizontal rotation support shaft and is driven vertically by a cylinder device linked to the end of the ram.

On this kind of work cutting device, the ram is normally maintained in a stationary state in the raised position by the lifitng force of the cylinder device but when maintenance or an inspection is to be performed, damage arises in the hydraulic system or there is a power failure, the ram can not be maintained in the raised position. Due to this, when it is necessary to raise the ram for maintenance or inspection, another operator must lift it by hand or a device such to be inserted into the machine after lifting is necessary, the operatability is poor.

SUMMARY OF THE INVENTION

In order to solve these problems, it is an object of the present invention to propose a work cutting apparatus which is able to hold the ram in the raised position without using drive force and for which the maintenance and inspection operations are efficient and safe during a power failure or breakdown or the like.

It is another object of the present invention to prevent the generation of looseness when the ram is operating by an exertion means that holds the ram in the raised position when the rotation center shaft is angled with respect to the sides of the blade.

It is yet another object of the present invention to propose a work cutting apparatus that is able to efficiently store the exertion means that holds the ram in the raised position in a limited space.

The present invention, being a work cutting apparatus that cuts by a pair of upper and lower blades, is provided with a freely rotating ram mounted with the upper blade, a ram drive device that rotationally drives the ram and an exertion means that applies a force on the ram in the raised rotation direction.

Due to this arrangement, the ram is held in the raised position by the exertion means while no drive force is being applied by the ram drive device. Thus even if the ram drive device can not be operated due to a power failure or breakdown, the ram may be held in the raised position and maintenance and inspection of inside the machine may be performed. Accordingly, maintenance and inspection may be performed more efficiently. The downwards driving of the ram by the ram drive device is performed in resistance to the force exerted by the exertion means and due to this, it is preferable for the exertion means to apply as weak a force as possible within the range where lifting of the ram is possible.

In the work cutting apparatus, the rotation center shaft of the ram is positioned at an angle within the horizontal plane with respect to the sides of the pair of upper and lower blades. The exertion means may be positioned such that the horizontal component of the applied force is at right angles to the rotation center shaft.

By having the rotation center shaft angled with respect to the sides of the blade, when the blade is L-shaped, the adjustment of the clearance between the upper and lower blades being necessary due to the differences in thickness of the material, may be performed simultaneously by the adjustment of a single place for both sides of the blade. Conversely, when the ram is supported by this kind of angled rotation center shaft, when the ram is exerted by the exertion means, a change in clearance in association with the rotation easily occurs. However, in the present invention, the direction in which the force is applied by the exertion means is a direction at right angles to the rotation center shaft of the ram thus changes in the clearance of the upper and lower blade by the exerted force of the exertion means in association with the rotation of the ram are prevented.

Furthermore, the exertion means comprises a plurality of coil springs and those plurality of coil springs may be positioned parallel such that the ends are aligned with one side of the upper and lower blades.

Each coil spring needs to be of fairly large size as the ram is a heavy mass object but may be contained within a compact limited space by the positional relationship of the each of the coil springs.

BRIEF DESCRIPTION OF THE DRAWING

FIG. 9A is an enlarged horizontal section showing the attachment part of the rotating shaft on the work cutting apparatus being one embodiment of the present invention, FIG. 9B is an enlarged horizontal section showing the axial direction pressure application means on the rotating shaft of the work cutting apparatus being one embodiment of the present invention and FIG. 9C is an enlarged side view of the axial direction pressure application means of the work cutting apparatus being one embodiment of the present invention.

DETAILED DESCRIPTION OF THE PREFERRED EMBODIMENTS

Hereafter, a first embodiment of the present invention will be described using FIGS. 1 through 10.

Figure 5:
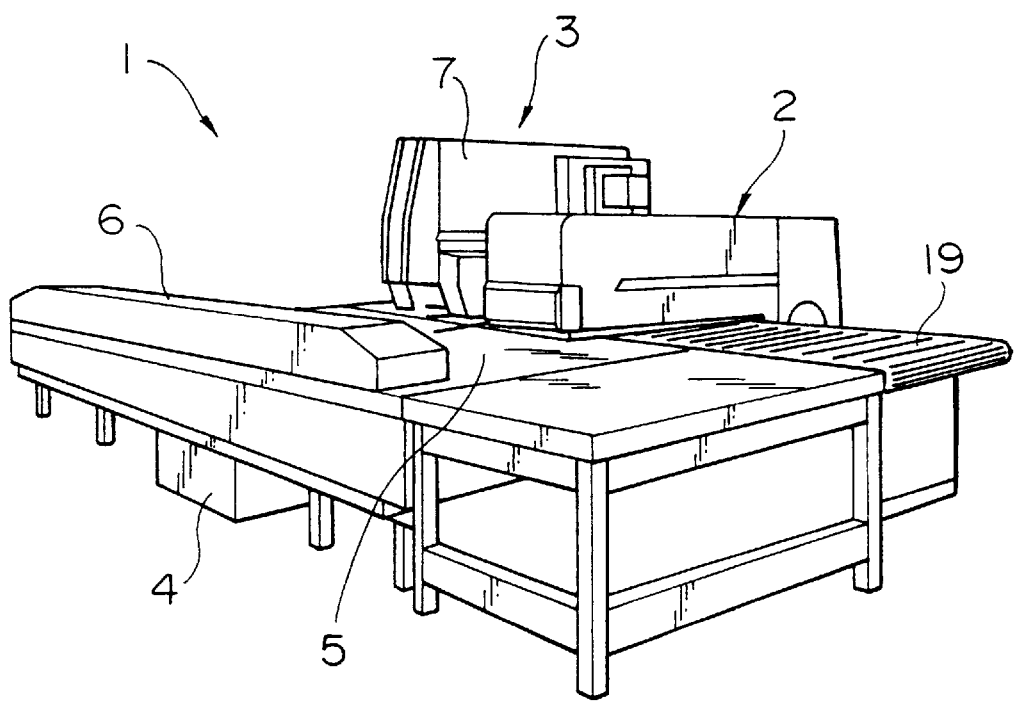
FIG. 5 is a perspective view of the outer appearance of a work processing apparatus provided with the work cutting apparatus being one embodiment of the present invention.
Figure 6:
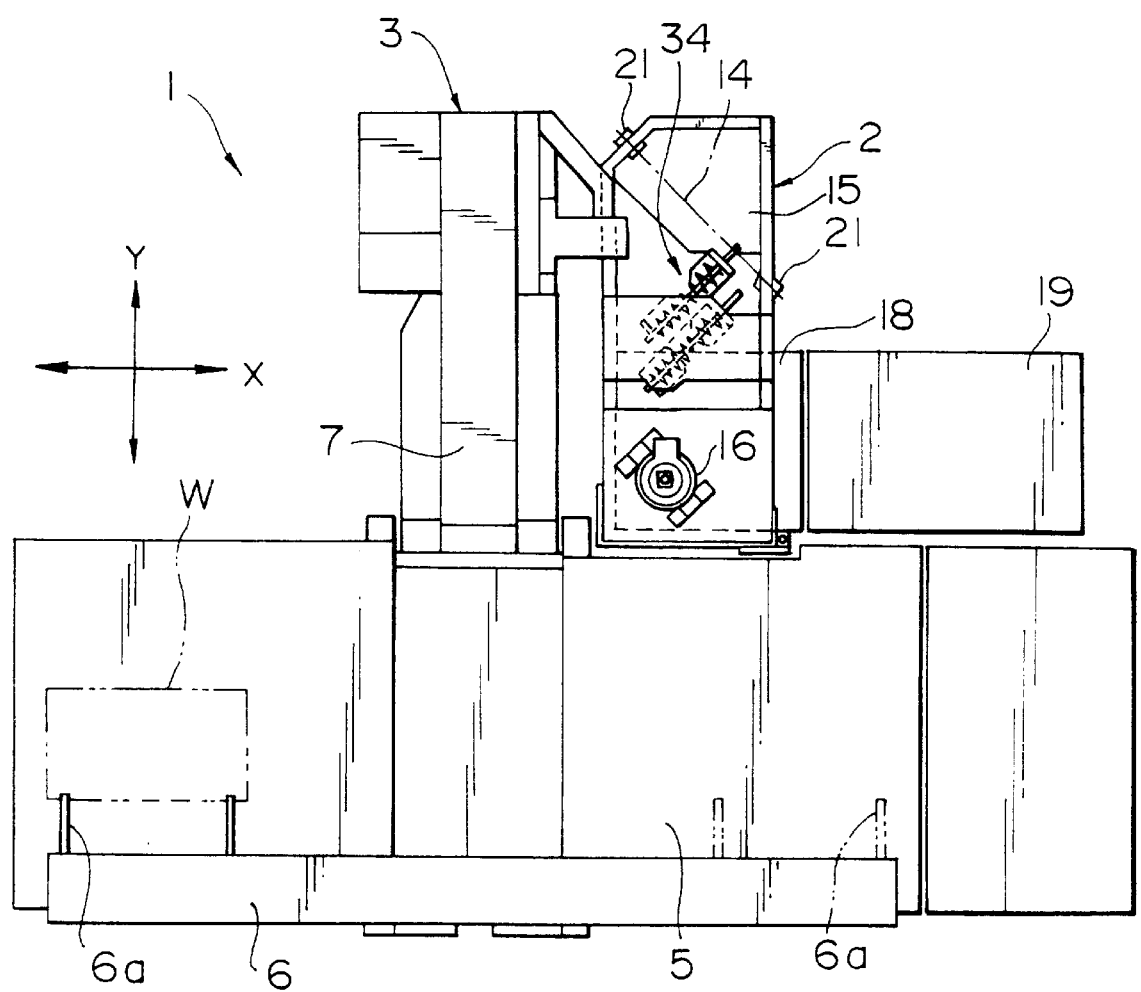
FIG. 6 is plan view of a work processing apparatus provided with the work cutting apparatus being one embodiment of the present invention.

FIGS. 5 and 6 show a perspective view and plan view of the work processing apparatus provided with a work cutting apparatus being a first embodiment of the present invention.

A work processing apparatus 1 is arranged with a turret type punch press device 3 adjacent to a work cutting apparatus 2 and comprises a compound device where both a work table 5 and work delivery device 6 are common to both devices 2,3. The work delivery device 6 holds work W on the work table 5 by a work holder 6*a*, moves it in the left and right direction (X-axis direction) and front/back direction (Y-axis direction), spans both the cut processing part of the work cutting apparatus 2 and the punch press device 3 and has a delivery range enabling delivery of the work W in the held state. To the rear of a bed 4, a C-shaped punch frame 7 of the punch press 3 is arranged and an upper turret (not shown in the drawings) with a plurality of punch tools arranged in series, a lower turret (not shown in the drawings) with a plurality of die corresponding to each of the aforementioned punch tools are arranged in series, and a punch driving system (not shown in the drawings) that vertically drives the punch tool at a predetermined punch position.

The work cutting apparatus 2 cuts the work W which has had holes opened in it by the punch press device 3 and which is delivered by the work delivery device 6 and as shown in the plan view, front view, right side view and left side view of FIGS. 1, 2, 3, and 4, has a movable blade 12 and fixed blade 13 positioned vertically opposite each other on a frame 11 being the work cutting apparatus main body. The frame 11 is a vertical rectangular box shape with a cut away shaped open part 11*a* existing from the front surface to the middle of both sides and due to this, the side shape of the frame forms a C-shape. The fixed blade 13 being the lower blade has a flat shape that curves in an L-shape from the left-right direction (X-axis direction) to the front-back direction (Y-axis direction) and is positioned along the inside lower edge of the cut away open part 11*a* of the frame 11. The movable blade 12 being the upper blade has a flat L-shape following the inside of the fixed blade 13 and the blade tip is arranged with one type of slant (rake angle) from one end to the other end via the center curve part.

The movable blade 12 is mounted on the lower part of the tip of the ram 15 supported so as to be able to freely rotate vertically via the rotating shaft 14 on the rear part of the frame 11. A ram drive device 16 comprising a hydraulic cylinder that vertically moves the ram 15 is arranged on the front upper surface of the frame 11 and this ram drive system 16, the ram 15, rotating shaft 14 and the like form a movable blade drive system 17 that moves the movable blade 12 vertically. Due to the vertical movement of the movable blade 12 by the driving of the drive system 17, the movable blade 12 engages with the fixed blade 13 and a cutting process is performed by the shearing of the work W.

Furthermore, a conveyor 18 that ejects in the transport direction A parallel with the X-axis direction, the cut sample cut from the work W by the movable blade 12 and fixed blade 13, is arranged on the inside of the frame 11. A secondary conveyor 19 that further moves the cut samples which have transported by the conveyor 18 is positioned on the next level of the conveyor 18.

Figure 1:
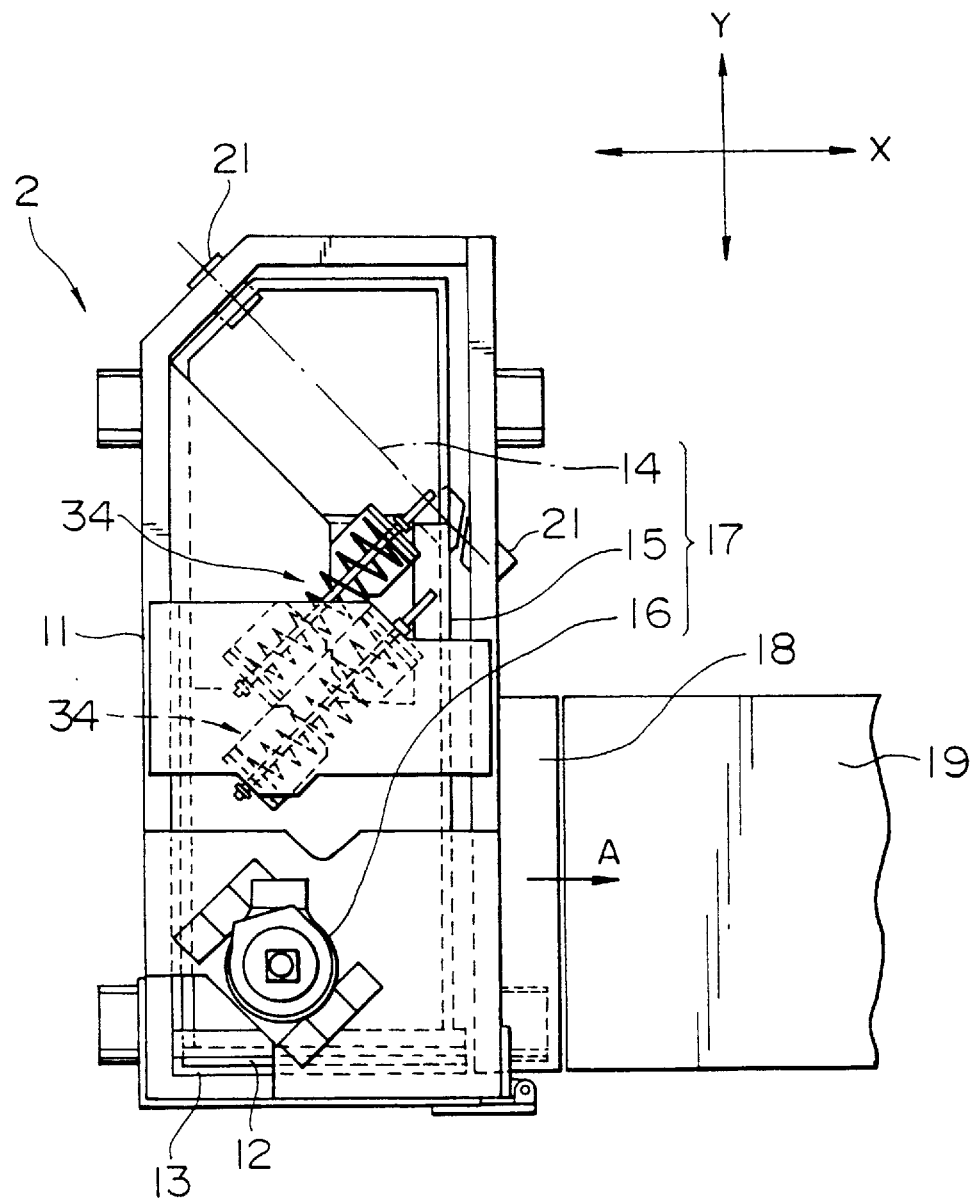
FIG. 1 is a partially omitted plan view of the work cutting apparatus being one embodiment of the present invention.
Figure 2:
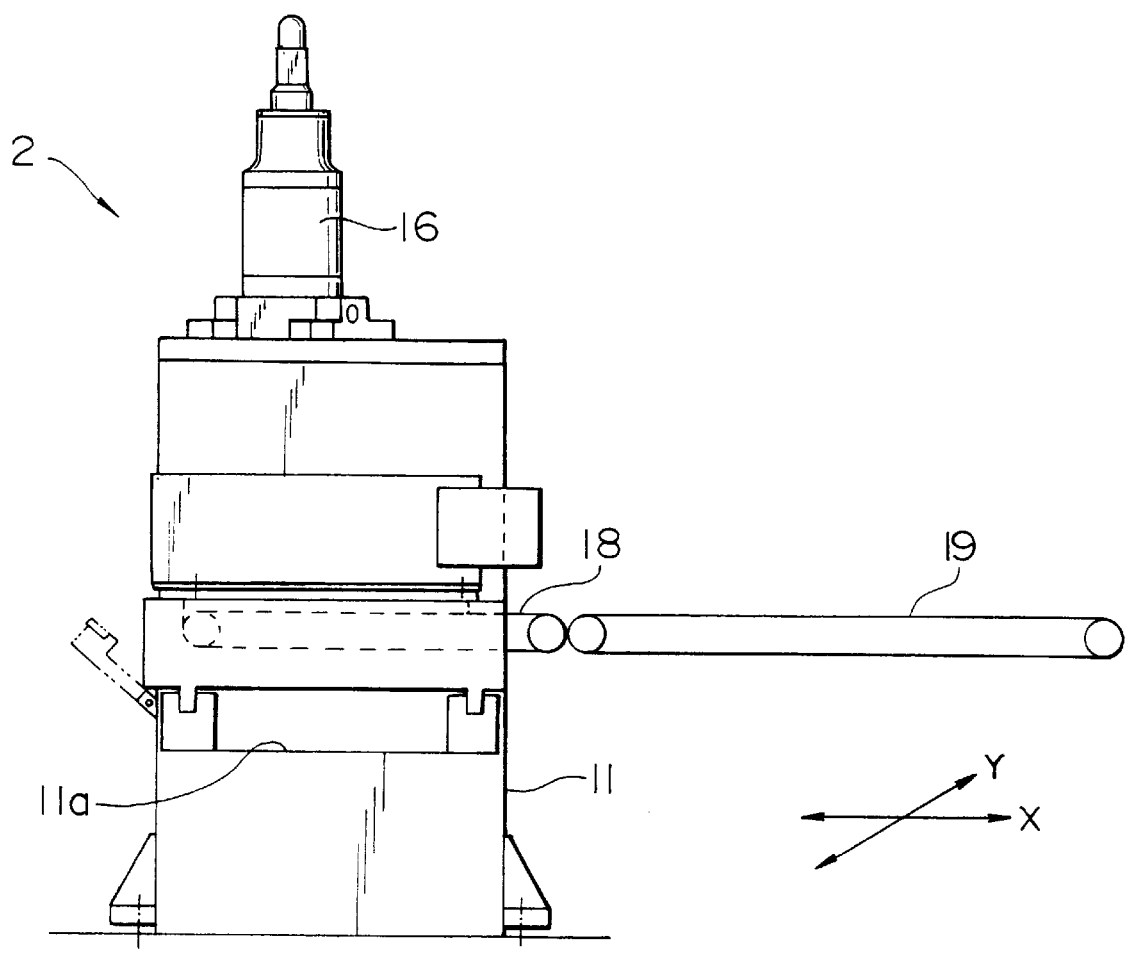
FIG. 2 is a front view of the work cutting apparatus being one embodiment of the present invention.
Figure 3:
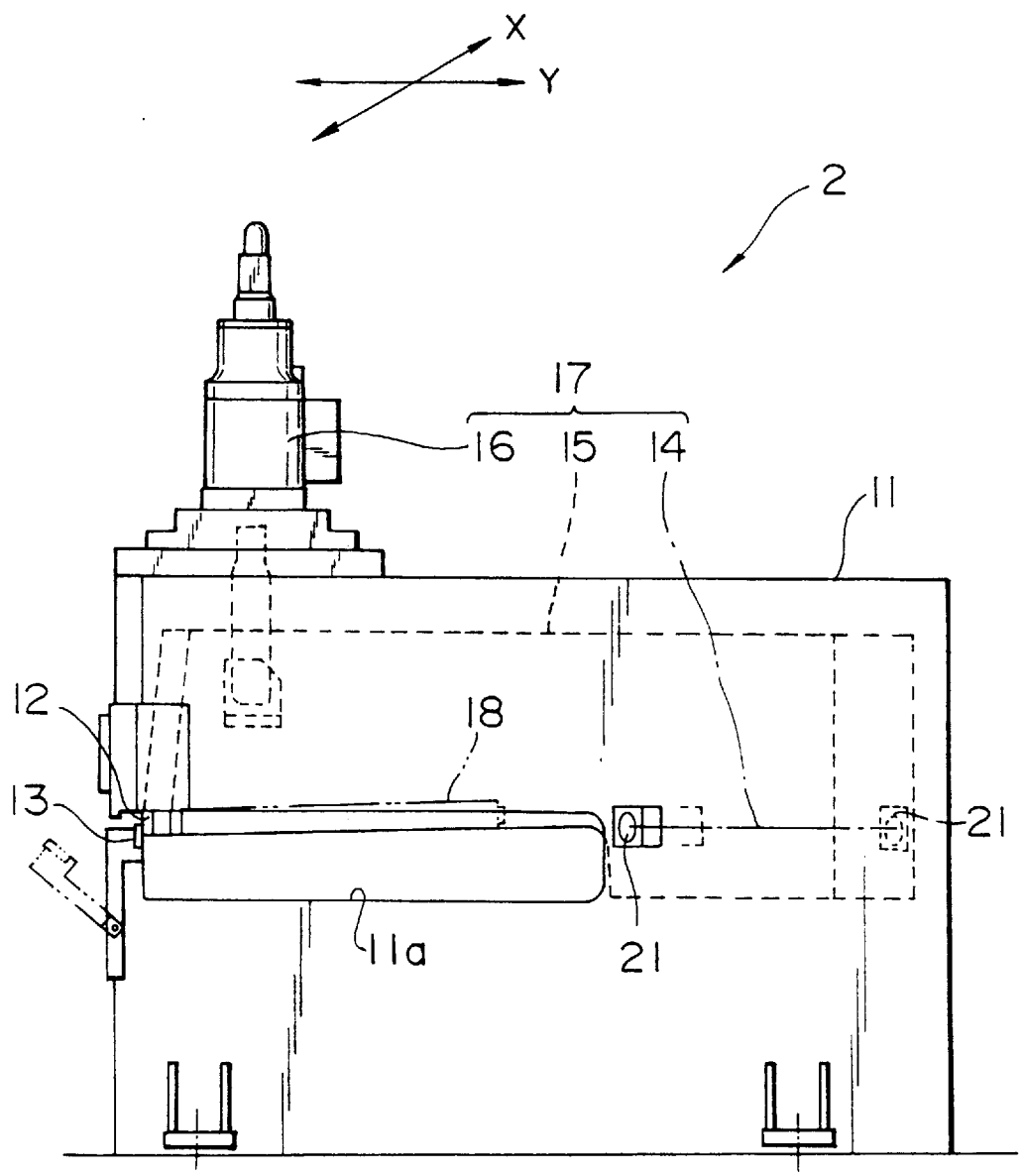
FIG. 3 is a right side view of the work cutting apparatus being one embodiment of the present invention.
Figure 4:
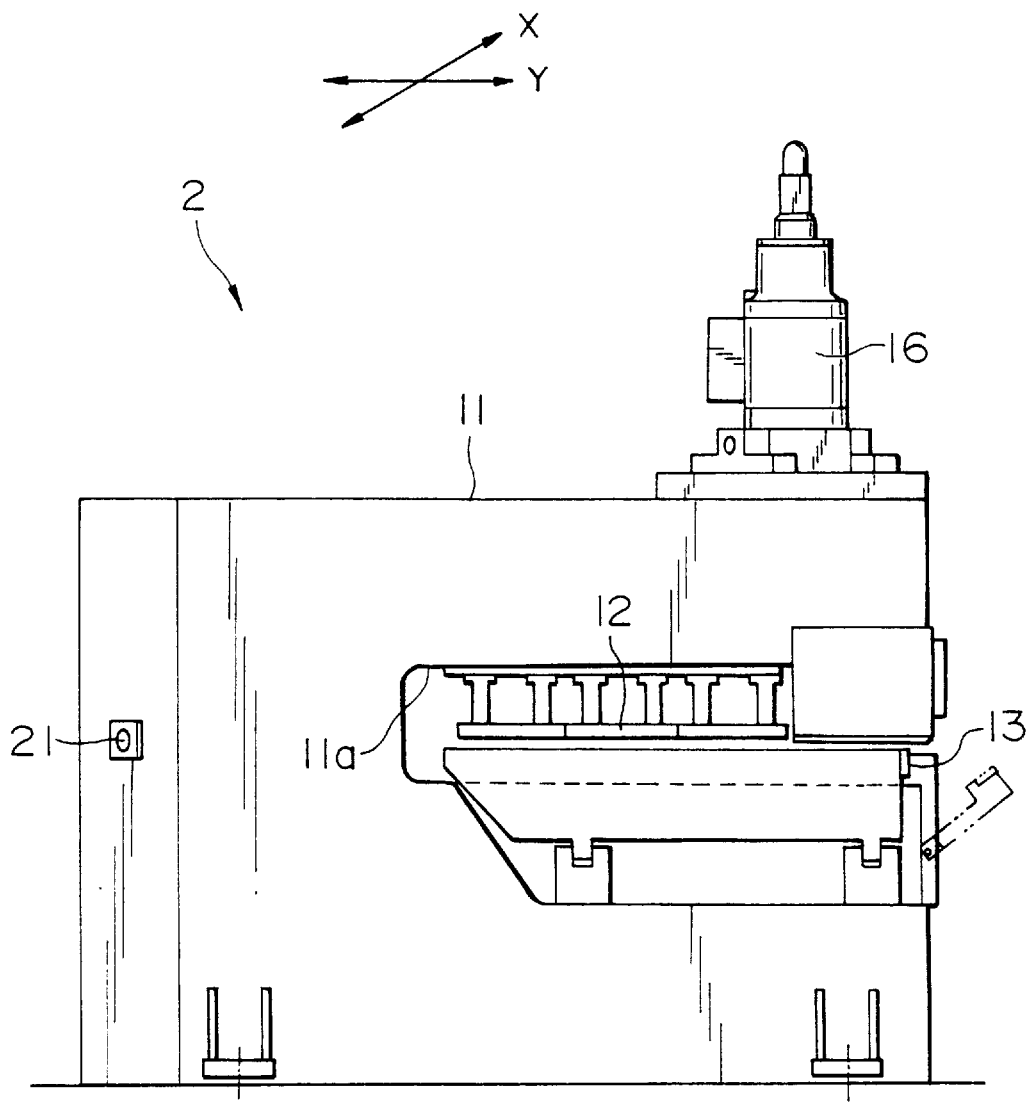
FIG. 4 is a left side view of the work cutting apparatus being one embodiment of the present invention.
Figure 7:
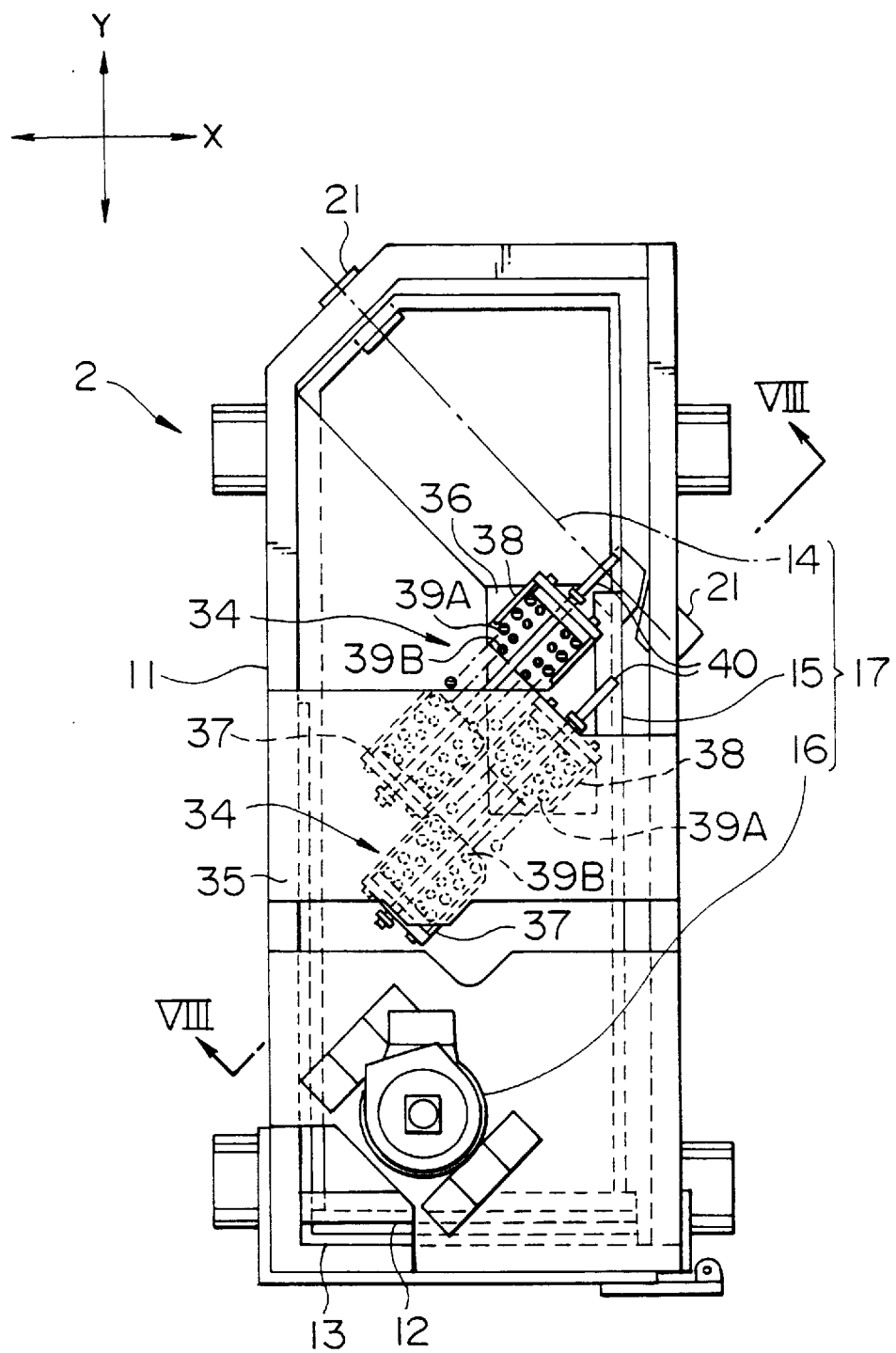
FIG. 7 is an enlarged plan view showing the main part of the work cutting apparatus being one embodiment of the present invention.

As shown in the plan views of FIG. 1, FIG. 7 and FIG. 9, the rotating shaft 14 is set so that the axial direction is angled with respect to both sides of the L-shaped fixed blade 13, for example, in a direction angled 45° with respect to both the X-axis and Y-axis.

The ram 15 is supported with respect to this rotating shaft 14 so as to be able to freely rotate via bearings 26 at both sides. A spherical bearing having an inner wheel 26*a* mounted on the rotating shaft 14 and an outer wheel 26*b* mounted on the ram 15 is used as the bearings 26. Furthermore, as shown in the vertical section of FIG. 10A, the rotating shaft 14 is arranged eccentrically as one unit on the supported rotation shaft 21 via a seat 27 on the frame 11. Specifically, when the rotation shaft 21 is in the standard rotation position, the shaft center 02 of the rotating shaft 14 is slightly eccentric upwards by the amount Δd with respect to the shaft center 01 of the rotation shaft 21.

Furthermore, when the rotation shaft 21 is in the standard rotation position, the clearance in the horizontal direction of the movable blade 12 with respect to the fixed blade 13 is set to be the optimum for cutting the work W of a predetermined thickness.

A manual type movable blade adjustment means 22 is linked to the rotation shaft 21. The movable blade adjustment means 22 is a means for adjusting the horizontal position of the movable blade 12 with respect to the fixed blade 13 by minute changes to the front and rear of the shaft center of the rotating shaft 14 by rotating the rotation shaft 21. This movable blade adjustment means 22 comprises a sector gear 23 fixed to the end of the rotation shaft 21 and an adjustment handle 25 having a pinion 24 on the shaft part that engages with this sector gear 23. The adjustment handle 25 is mounted on the frame 11 so as to be freely rotatable.

When the adjustment handle 25 is rotated, the rotation shaft 21 rotates in a direction opposite the adjustment handle 25 by an amount equivalent to the amount the adjustment handle 25 was rotated and the position of the rotating shaft 14 is adjusted to the front and rear. Due to this, the clearance of the movable blade 12 with respect to the fixed blade 13 is adjusted corresponding to the thickness of the work W to be cut. As the rotating shaft 14 is positioned at an angle 45° with respect to both sides of the fixed blade 13, adjustment for both the side following the X-axis direction of the movable blade 12 and Y-axis direction may be simultaneously performed by the aforementioned single adjustment.

Furthermore, there is no need to arrange the movable blade adjustment means 22 for each side and one is sufficient and has a simple arrangement.

It should be noted that the adjustment amount by the movable blade adjustment means 22 is limited by a pair of stoppers 28 which contact the sector gear 23 arranged on the frame.

Furthermore, the movable blade adjustment means 22 is a manual type as shown in the drawing but may be a driven type that changes the rotation angle of the rotation shaft 21 with a servomotor or the like as a drive source.

Figure 10C:
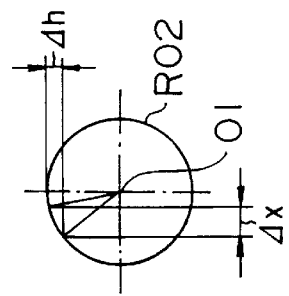
FIG. 10B is a side view showing the main part of the movable blade adjustment means on the work cutting apparatus being one embodiment of the present invention and FIG. 10C is an explanation of the adjustment actions.
Figure 10B:
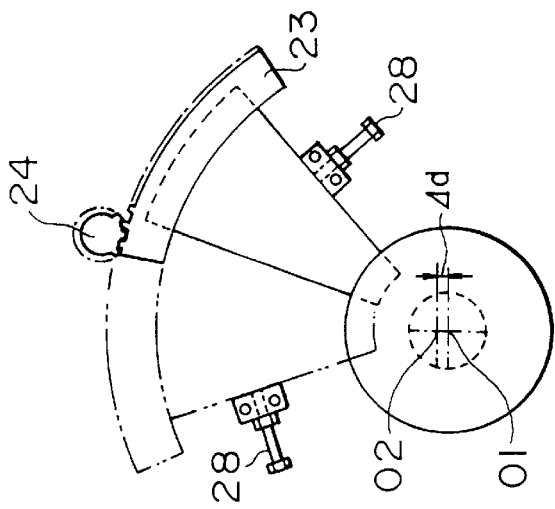
Figure 10A:
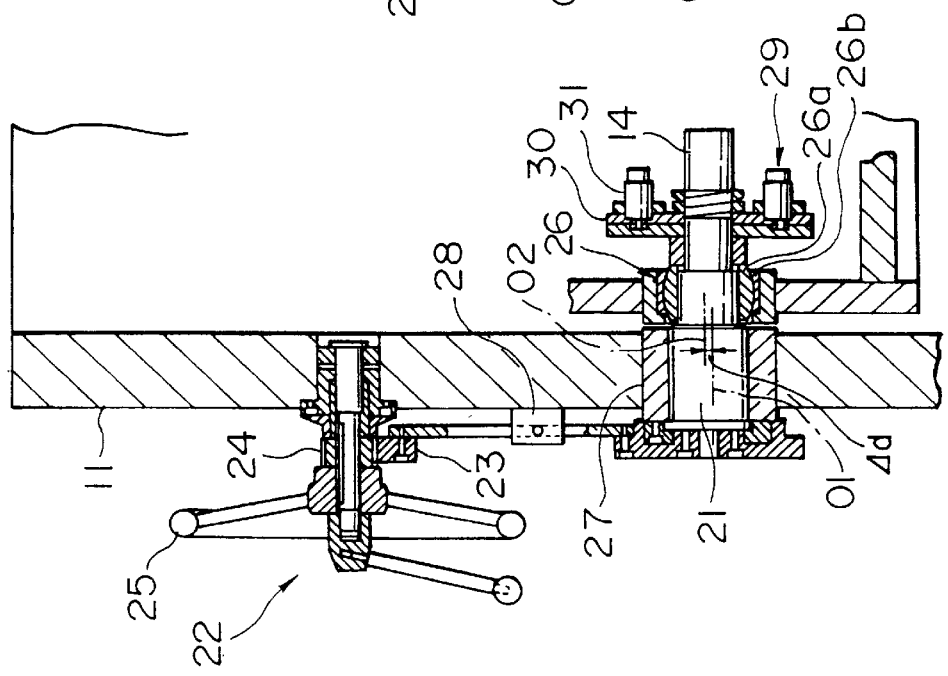
FIG. 10A is a vertical section showing the movable blade adjustment means on the work cutting apparatus being one embodiment of the present invention.

FIG. 10C shows the rotation path R02 of the shaft center 02 of the rotating shaft 14 with respect to the shaft center 01 of the rotation shaft 21 in association with the movable blade adjustment. As shown clearly in the drawing, the position of the rotating shaft 14 changes not only towards the front and rear but also vertically but as previously described by the movable blade adjustment means but when the rotation shaft 21 is in the standard rotation position, as the shaft center 02 of the rotating shaft 14 is eccentric upwards from the shaft center 01 of the rotation shaft 21, the vertical positional change amount Δh is extremely small compared to the positional change Δx to the front and rear of the rotating shaft 14 by the adjustment and considering the size of the ram 15, the vertical positional change may be ignored. Furthermore, the larger the distance between the rotating shaft 14 and movable blade 12, the more insignificant this vertical positional change.

Furthermore, an axial direction pressure application means 29 that prevents play in the axial direction of the ram 15 with respect to this rotating shaft 14 is arranged on the rotating shaft 14. This axial direction pressure application means 29 comprises a plurality of cylinders 31 mounted on a support plate 30 fixed to the rotating shaft 14, a pressure plate 32 linked to a piston rod 31a of each cylinder 31 and freely fitted to the rotating shaft 14, and a spacer 33 intervening between this pressure plate 32 and the inner wheel 26a of the bearing 26.

When the pressure plate 32 applies pressure to the bearing 26 side by the projection of the cylinder 31, that applied pressure is exerted on the inner wheel 26a of the bearing via the spacer 33. Due to this, as the rotating shaft 14 is pushed in a direction opposite to that which the pressure is applied, play in the axial direction of the ram 15 with respect to the rotating shaft 14 is removed and the bearing 26 is pressurized. As a result, the variation in clearance of between the movable blade 12 and fixed blade 13 arising from play of the ram 15 is prevented.

In particular, in the present embodiment, as the rotating shaft 14 is set in a direction at an angle with respect to all the sides of the movable blade 12 and fixed blade 13, the variation in the clearance at both sides of the movable blade 12 and fixed blade 13 may be prevented by the actions of the axial direction pressure application means 29.

It should be noted that when the movable blade is to be adjusted as described previously, it is possible to remove the pressure on the inner wheel 26a of the bearing 26 by removing the projection of the cylinder 31 and rotating the rotating shaft 14 with respect to the bearing 26 with no resistance.

Furthermore, as shown in the plan view and vertical section of FIGS. 7 and 8, two exertion means 34 that push the ram 15 in the upwards rotation direction are arranged between the upper part of the frame 11 and the upper part of the ram 15. These exertion means 34 comprise a spring receptor member 37 fixed to the upper support plate 35 of the frame 11, a spring receptor member 38 fixed to the upper support plate 36 of the ram 15, a plurality of compressed coil springs 39A,39B that fit on both of these spring receptor members 37,38 and a center rod 40 inserted loosely into both spring receptor members 37,38 such that it can not be removed. A uniform rigidity is applied to the exertion means 34 by the center rod 40. This exertion means 34 is set horizontally, such that the axial direction, in short, the direction of the center rod 40 is at right angles to the rotating shaft 14. Due to this, the horizontal component of the exerted force of the exertion means 34 is at right angles to the rotating shaft 14 of the ram 15.

It should be noted that in the present embodiment, in order for enough exerted force of the exertion means 34 to be generated, the two exertion means 34 are positioned parallel to each other in the same direction, in short, the ends of the compressed coil springs 39A,39B of each exertion means 34 are each aligned along the vertical side of the upper and lower blades 12,13. In this way, each of the exertion means 34 comprises a plurality of compressed coil springs 39A, 39B and due to the arrangement of two exertion means 34, an exertion means 34 having sufficient exertion force may be compactly positioned in the restricted space between the upper part of the frame 11 and the upper part of the ram 15.

Figure 8A:
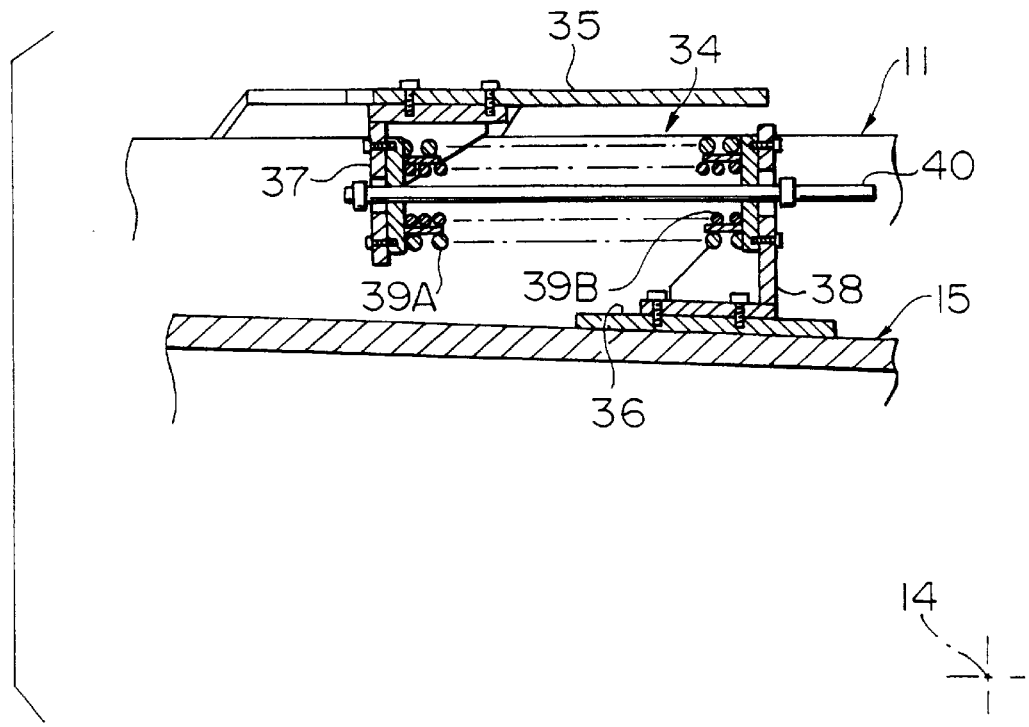
FIG. 8 is an explanatory diagram of the actions of the exertion means on the work cutting apparatus being one embodiment of the present invention.

The exertion means 34 exerts a force on the ram 15 in the upwards rotating direction as shown in FIG. 8A as the horizontal component of the exerted force of the compressed coil springs 39A,39B is at right angles with respect to the rotating shaft 14 above the rotating shaft 14. Due to this, the ram 15 always forcibly returns to the home position in the raised position by the exertion means 34, is safe and enables simple maintenance inspection and repair operations even when there are problems such as the stoppage of the drive device 16 due to a power failure.

Furthermore, the exertion means 34 is positioned at right angles with respect to the rotating shaft 14 and as the exertion means 34 rotates in the same direction as the rotation of the ram 15, the clearance between the upper and lower movable blade 12 and fixed blade 13 due to the existance of the exertion means 34 changes and the ram 15 can be prevented from being slack.

Figure 8B:
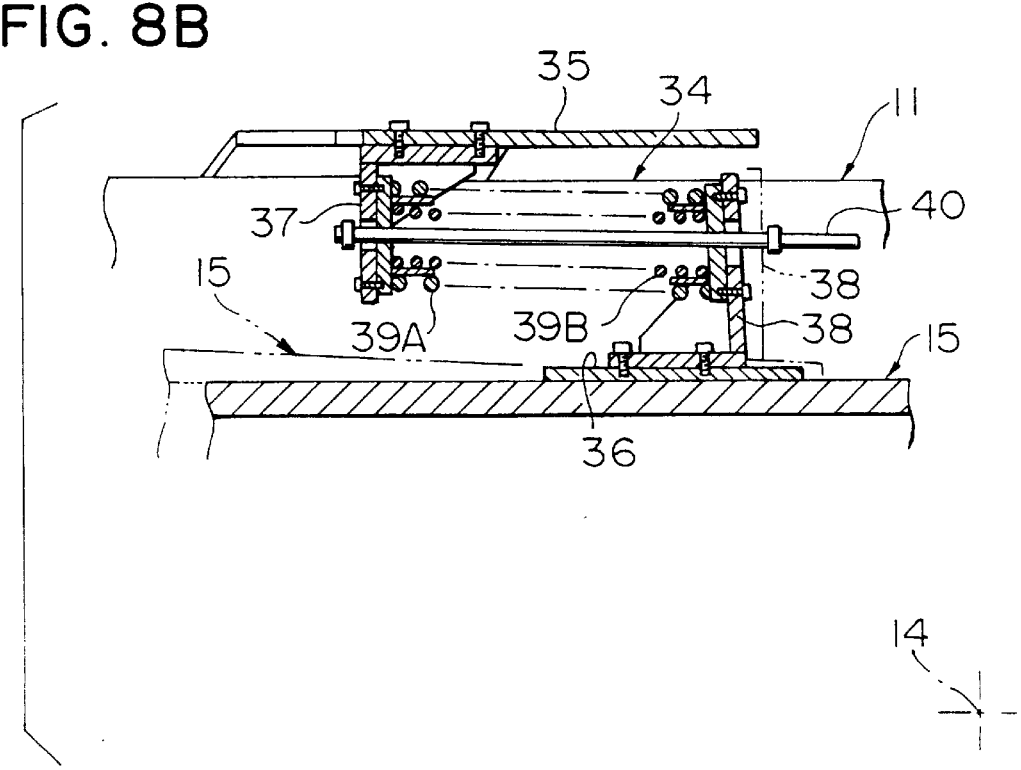

It should be noted that when the ram 15 is rotated downwards by the ram drive device 16, the ram drive device 16 works against the exerted force of the exertion means 34 as shown in FIG. 8B.

As the present invention, being a work cutting apparatus that cuts by a pair of upper and lower blades, is provided with a freely rotating ram mounted with the upper blade, a ram drive device that rotationally drives the ram and an exertion means that applies a force on the ram in the raised rotation direction, the ram may be held in the raised position without using a drive force and maintenance and inspection may be performed more efficiently even during a power failure or breakdown.

In this arrangement, the rotation center shaft of the ram is positioned at an angle within the horizontal plane with respect to the sides of the pair of upper and lower blades and when the exertion means is positioned such that the horizontal component of the applied force is at right angles to the rotation center shaft, looseness in the ram during a rotation movement is prevented due to the exertion means that holds the ram in the raised position even when the rotation center shaft is angled with respect to the sides of the blade as previously mentioned in order to facilitate adjustment of the clearance between the upper and lower blades.

Furthermore, the exertion means comprises a plurality of coil springs and when those plurality of coil springs are positioned parallel such that the ends are aligned with one side of the upper and lower blades, the exertion means having sufficient exertion force may have a compact arrangement.

I claim:

1. A workpiece cutting apparatus comprising:
    a pair of upper and lower blades for cutting a workpiece;
    a freely rotating ram having said upper blade mounted thereon, wherein said ram has a rotation center shaft which is movable in a direction perpendicular to said rotation center shaft in order to facilitate adjustment of a clearance between said pair of upper and lower blades;
    a ram drive means, connected to said ram, for rotationally driving said ram;
    a movable blade adjustment means for moving a position of said rotation center shaft in a direction perpendicular to said rotation center shaft and adjusting a clearance between said pair of upper and lower blades; and
    at least one exertion means, mounted within said ram, for applying an exerted force in an upwardly rotating direction relative to said ram, wherein said at least one exertion means is positioned such that said at least one exertion means has a vertical component that exerts a force on said ram in a vertical direction and a horizontal component that exerts a force on said ram in a horizontal direction, and wherein said horizontal component of said at least one exertion means exerts a force on said ram in said direction perpendicular to said rotation center shaft and constantly maintains said clearance which has been adjusted by said movable blade adjustment means.

2. The workpiece cutting apparatus as in claim 1, wherein said axial direction of said rotation center shaft is positioned at an angle within a horizontal plane with respect to sides of said pair of upper and lower blades.

3. The workpiece cutting apparatus as in claim 1, wherein said at least one exertion means comprises a plurality of coil springs and said plurality of coil springs are positioned in parallel such that end parts thereof are aligned with each other along one side of said pair of upper and lower blades.

* * * * *